United States Patent
Razdan et al.

(10) Patent No.: US 6,253,285 B1
(45) Date of Patent: *Jun. 26, 2001

(54) METHOD AND APPARATUS FOR MINIMIZING DCACHE INDEX MATCH ALIASING USING HASHING IN SYNONYM/SUBSET PROCESSING

(75) Inventors: Rahul Razdan, Princeton; Richard E. Kessler, Shrewsbury; James B. Keller, Waltham, all of MA (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/116,039

(22) Filed: Jul. 15, 1998

Related U.S. Application Data (63) Continuation of application No. 09/061,443, filed on Apr. 16, 1998, now abandoned.

(51) Int. Cl.$^7$ ...................................................... C06F 12/00
(52) U.S. Cl. ........................... 711/118; 711/202; 711/203; 711/206; 711/210; 711/216
(58) Field of Search ................................... 711/118, 202, 711/203, 210, 216, 206

(56) References Cited

U.S. PATENT DOCUMENTS

| | | | |
|---|---|---|---|
| 4,551,797 | * 11/1985 | Amdahl et al. ...................... | 711/202 |
| 4,727,482 | * 2/1988 | Roshon-Larsen et al. .......... | 711/202 |
| 4,731,739 | * 3/1988 | Woffinden et al. . | |
| 5,003,459 | 3/1991 | Ramanujan et al. ................. | 364/200 |
| 5,056,002 | 10/1991 | Watanabe ............................. | 364/200 |
| 5,228,136 | 7/1993 | Shimizu et al. ..................... | 395/425 |
| 5,287,484 | 2/1994 | Nishii et al. ......................... | 395/425 |
| 5,319,768 | 6/1994 | Rastegar ............................... | 395/425 |
| 5,335,335 | 8/1994 | Jackson et al. ...................... | 395/425 |
| 5,418,922 | * 5/1995 | Liu ........................................ | 711/3 |
| 5,420,991 | 5/1995 | Konigsfeld et al. ................. | 395/375 |
| 5,465,344 | 11/1995 | Hirai et al. ........................... | 395/458 |

(List continued on next page.)

OTHER PUBLICATIONS

"Efficient Hardware Functions for Higher Performance Computers," M.V. Ramakrishna, E. Fu, and E. Bahcekalli, IEEE Transactions on Computers, vol. 46, No. 12, Dec. 1997, pp. 1378–1381.*

Primary Examiner—Do Hyun Yoo
Assistant Examiner—Mehdi Namazi
(74) Attorney, Agent, or Firm—Hamilton, Brook, Smith & Reynolds, P.C.

(57) ABSTRACT

A data caching system comprises a hashing function, a data store, a tag array, a page translator, a comparator and a duplicate tag array. The hashing function combines an index portion of a virtual address with a virtual page portion of the virtual address to form a cache index. The data store comprises a plurality of data blocks for holding data. The tag array comprises a plurality of tag entries corresponding to the data blocks, and both the data store and tag array are addressed with the cache index. The tag array provides a plurality of physical address tags corresponding to physical addresses of data resident within corresponding data blocks in the data store addressed by the cache index. The page translator translates a tag portion of the virtual address to a corresponding physical address tag. The comparator verifies a match between the physical address tag from the page translator and the plurality of physical address tags from the tag array, a match indicating that data addressed by the virtual address is resident within the data store. Finally, the duplicate tag array resolves synonym issues caused by hashing. The hashing function is such that addresses which are equivalent mod $2^{13}$ are pseudo-randomly displaced within the cache. The preferred hashing function maps VA<14, 15 XOR 13, 12:6> to bits <14:6> of the cache index.

23 Claims, 6 Drawing Sheets

U.S. PATENT DOCUMENTS

| | | | |
|---|---|---|---|
| 5,509,135 | 4/1996 | Steely, Jr. | 395/474 |
| 5,515,522 * | 5/1996 | Bridges et al. | 711/141 |
| 5,530,958 | 6/1996 | Agarwal et al. | 395/403 |
| 5,579,503 * | 11/1996 | Osborne | 711/119 |
| 5,603,004 * | 2/1997 | Kurpanek et al. | 711/118 |
| 5,671,391 | 9/1997 | Knotts | 395/470 |
| 5,978,886 | 11/1999 | Moncton et al. | 711/118 |
| 6,038,647 | 3/2000 | Shimizu | 711/168 |

* cited by examiner

FIG. 1

(PRIOR ART)

METHOD AND APPARATUS FOR MINIMIZING DCACHE INDEX MATCH ALIASING USING HASHING IN SYNONYM/SUBSET PROCESSING

RELATED APPLICATION

This application is a Continuation of Application Ser. No. 09/061,443 filed Apr. 16, 1998, now abandoned the contents of which is incorporated herein by reference in its entirety.

BACKGROUND OF THE INVENTION

In general, main memory access is relatively slow compared to central processing unit (CPU) execution times. Therefore, most CPU architectures include one or more caches. A cache is a high-speed memory which can be associated with a small subset of referenced main memory. Because most memory reference patterns only require a small subset of the main memory contents, a relatively smaller, high-speed cache can service many of the memory references.

For example, instruction caches can improve efficiency because often in software programs a small section of code may be looping. By having the instructions in a high-speed, local instruction cache, they are accessed much faster. Data caches can likewise improve efficiency because data access tends to follow the principle of locality of reference. Requiring each access to go to the slower main memory would be costly. The situation can be even worse in a multi-processor environment where several CPUs may contend for a common bus.

Data cache systems in some configurations comprise both a data store and a tag array. The data store holds data copied from the main memory. Each tag array location holds a tag, or physical page address, for a block of consecutive data held in the data store in association with the tag location.

During a memory access, a virtual page address from the CPU core is translated by a page translator into a physical page address. The remainder of the address, or a portion thereof, is used to index into the tag array. The tag retrieved from the indexed tag array is compared with the translated physical page address, a match indicating that the referenced data is in the data store; a mismatch indicates that the data will have to be retrieved from main memory. Page translation occurs in parallel with the tag array lookup, minimizing delay.

A need also exists in multiprocessor systems to test the contents of the data cache system from outside the CPU. Several processors may reference the same physical address in memory. Besides looking up its own local cache, each CPU must check the caches of other CPUs in the system. Failure to do so would result in data incoherency between the individual caches as each CPU reads and writes to its own local copy of the same data from main memory.

To prevent this incoherency, a CPU sends "probes" to other CPUs during a memory reference. Each data cache system receiving a probe uses a physical address provided by the probe to look into its own tag array. If the data resides in its data store, the data cache system responds to the probing CPU accordingly allowing ownership arbitration to take place.

A problem with caches is that they are susceptible to reference patterns in which memory references collide in such a way that the entire cache is not utilized, e.g. where two memory addresses are referenced which have different page addresses but the same index value. Due to the common index, each memory reference will cause different data to be loaded to the same cache location, negating any beneficial effect of the cache. Unfortunately, these reference patterns, also known as "power-of-two stride" patterns, are somewhat common in many important software applications.

Set associative caches partially solve this problem by having more than one storage location for each index value, although they incur the additional cost of multiple port lookups into the cache tag and data arrays and additional hardware to decide in which of the locations to store a tag. For example, in a 2-way set associative cache, for each index value there are two possible locations into which data can be loaded. Thus it is not necessary to write over the previously loaded data. Of course, this does not fully resolve the problem if the power-of-two stride pattern comprises three or more colliding addresses.

Another method for dealing with the power-of-two stride problem hashes addresses into different locations such that collisions generated by $2^m$ (or close to $2^m$) reference patterns, for some integer m, are minimized. For example, U.S. Pat. No. 5,509,135 (Steely), "Multi-Index Multi-Way Set-Associative Cache", uses a different hashing function for each of the ways within a set. In another implementation targeted for direct-mapped caches, U.S. Pat. No. 5,530,958 (Agarwal), "Cache Memory System and Method With Multiple Hashing Functions and Hash Control Storage", a first hashing function is applied to create a cache index. If this results in a cache miss, a second hashing function is then applied, resulting in a different index, and so on.

SUMMARY OF THE INVENTION

In the context of a modern microprocessor pipeline, load-to-use latency can be minimized for data cache hits by using a portion of the virtual address directly to index the cache. If the index includes only the unmapped portion of the address, this method can be safely used because the index bits are in effect, physical address bits.

However, the goal of most hashing techniques is to incorporate the higher-order bits of the virtual address into the index. Yet, if the virtual page address bits are used to index the primary cache as discussed above, it is possible for a single physical address to be cached into multiple locations in the cache. Sufficient store activity, i.e., stores to the various virtual addresses which map to the same physical address, can lead to memory coherence problems.

Cache inefficiency resulting from power-of-two strides can be improved by using a hash function operating on part of virtual address to construct a cache index. However, a hashing function of a virtual address to create the whole cache index would require that the probes check all $2^n$ possible combinations where n is the size of the index, which is impractical.

The present invention solves this problem by employing a duplicate tag structure which physically indexes the cache at locations indexed by all combinations of the mapped virtual address bits concatenated with unmapped address bits. This guarantees that only one physical address is resident in the cache at a time, independent of the number of virtual mappings. The resolution of multiple virtual references to the same physical reference is referred to as synonym processing.

Given a duplicate tag structure or other means for synonym processing, the two bits VA<14, 13> can be arbitrarily hashed using the upper virtual address bits, and the duplicate dcache tag structure will automatically solve all synonym processing issues.

Accordingly, a preferred embodiment of the present invention comprises hashing means, a data store, a tag array, a page translator, a comparator and a duplicate tag array. The hashing means hashes an index portion of a virtual address with a virtual page portion of the virtual address to form a cache index. The data store comprises a plurality of data blocks for holding data. The tag array comprises a plurality of tag entries corresponding to the data blocks, and both the data store and tag array are addressed with the cache index. The tag array provides a plurality of physical address tags corresponding to physical addresses of data resident within corresponding data blocks in the data store addressed by the cache index. The page translator translates a tag portion of the virtual address to a corresponding physical address tag. The comparator verifies a match between the physical address tag from the page translator and the plurality of physical address tags from the tag array, a match indicating that data addressed by the virtual address is resident within the data store. Finally, the duplicate tag array resolves synonym issues caused by hashing.

In the preferred embodiment, the hashing means is such that addresses which are equivalent mod $2^{15}$ are pseudo-randomly displaced within the cache. The cache index comprises nine bits, and data blocks in the data store comprise sixty-four bytes.

In addition, the physical address tag is a physical page number, and a physical page comprises 8 Kb. The preferred hashing means maps VA<14, 15 XOR 13, 12:6> to bits <14:6> of the cache index.

In a preferred embodiment, the data cache is a 2-way set associative cache. Each set can optionally have its own hashing function.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
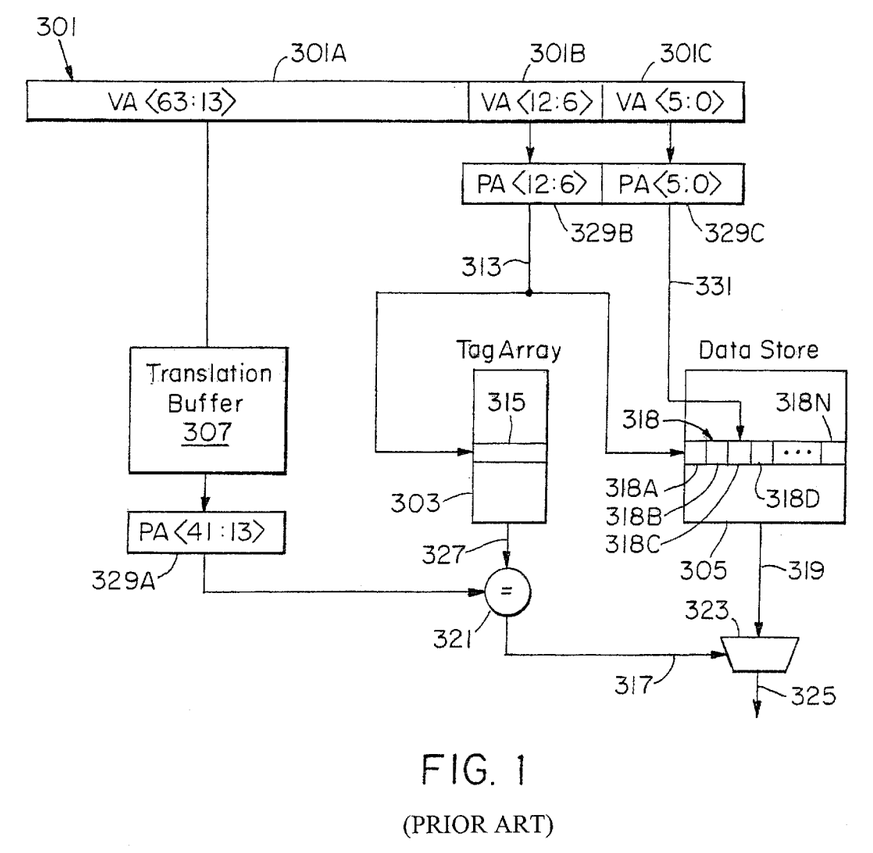
FIG. 1 is a block diagram of a prior art physically-tagged, physically-indexed data cache.

FIG. 1 is a block diagram demonstrating a prior art physically-tagged, physically-indexed data caching system comprising a translation buffer 307 and a data cache which itself comprises high-speed memory split into two parts: a data store 305 and a tag array 303. The primary task of the tag array 303 is to provide tag information to determine cache hits or misses.

Virtual address space is typically broken up into pages, the high order bits of a virtual address 301 defining a virtual page address 301A, and the low-order bits defining an index 301B and offset 301C respectively within the page. The virtual page address 301A is mapped to a physical page address 329A by the translation buffer 307. The index 301B and offset 301C are not mapped and are thus essentially both virtual and physical. Each tag array location 315 corresponds to one block 318 of sixty-four bytes in the data store 305. Therefore, the index 313 comprises only the bits 329B required to address a block of data.

Each value of the index 313 references some location in the tag array 303, for example location 315. The tag array 303 provides the tag 327 stored in location 315 upon presentation of the respective value of index 313. At the same time, the index 313 is used to reference the corresponding block 318 of data held in the data store 305. The offset 331 selects a particular location 318C within the block 318. The data stored in location 318C appears at the data store output 319, along with a valid bit (not shown).

At the same time the tag array is referenced, the virtual page address 301A is translated by the translation buffer 307, so that no extra delay is caused by the translation. The value of the tag array output 327 is compared, at comparator 321, with the physical page address 329A from the translation buffer 307. If there is a match and the corresponding valid bit is set (a cache hit), the retrieved data 319 is valid and passed by gate 323 as valid data 325. Otherwise there is a cache miss and the data must be retrieved from main memory.

Figure 2A:
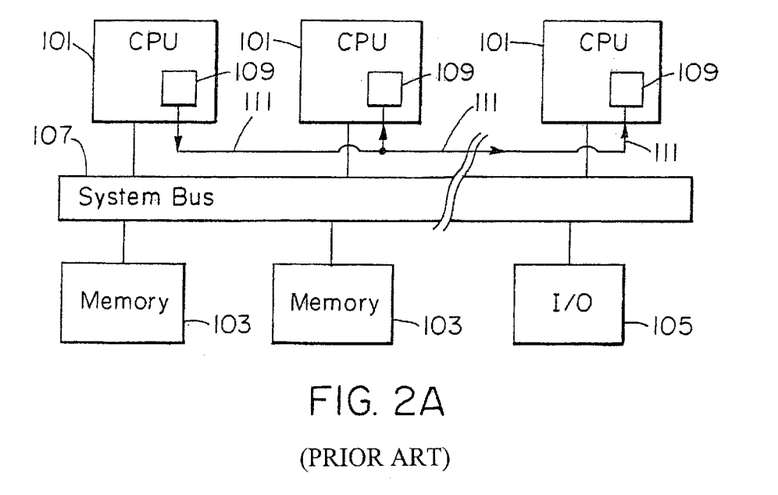
FIG. 2A is a block diagram of a typical multiprocessor computer system.

FIG. 2A is a block diagram of a typical multiprocessor computer system. Several processors (CPUs) 101 are linked to main memory modules 103 and I/O modules 105 through a system bus 107. While every location in main memory has a unique physical address, modern cPus typically use virtual addressing techniques in order to make available a virtual address space which can be larger or different than actual available physical memory.

Figure 2B:
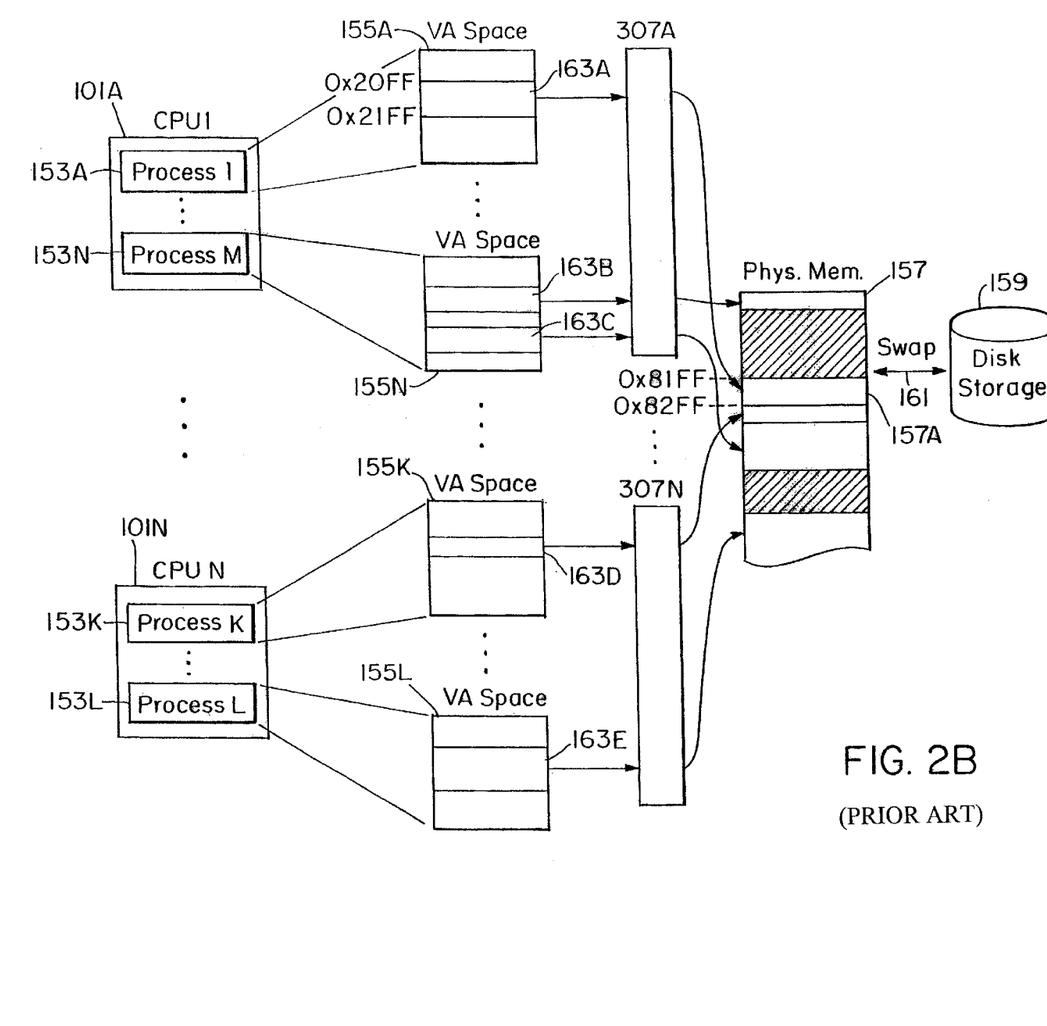
FIG. 2B is a block diagram demonstrating virtual addressing in the multiprocessor system of FIG. 2A.

FIG. 2B demonstrates the principle of virtual addressing in a N-processor system. Typically, each CPU 101A–N has several processes running at any given time. For instance, CPU 101A is executing Processes 1 through M. CPU 101N is running Processes K through L. Typically, each process 153 running on each CPU 101 has its own virtual address space 155, which except in special circumstances such as shared memory, is independent of other processes' virtual spaces.

At any given time, only some subset 163 of each virtual address space 155 is physically in main memory 157. As a specific example, memory block 163A in the virtual address space 155A of Process 1 153A of CPU 1 151A, having a virtual address range of 0x2OFF to 0x21FF is mapped to physical memory block 157A having a physical address range of 0x81FF to 0x82FF. When data is needed that is not in physical memory, it is swapped in from disk storage 159 by a swapper 161.

Each CPU 101 has a hardware-based translation buffer 307 that maps virtual addresses to the physical memory addresses that hold the desired data. Typically, the translation buffers 307 are integrated within their respective CPUs.

In a multiprocessor system as shown in FIG. 2A, during a main memory reference, the caches of all CPUs must be checked to ensure the data is not owned by another CPU, which could result in data incoherency. This is accomplished by sending probes from the referencing CPU to the other CPUs, typically over the system bus 107. A probe is a query to determine if any other CPU owns, or controls, a block of data. FIG. 2A shows a probe 111 being sent from one CPU to the other CPUs in the system. Because the CPUs have no knowledge about other CPUs' virtual address space mappings, probes use physical addresses.

Figure 3:
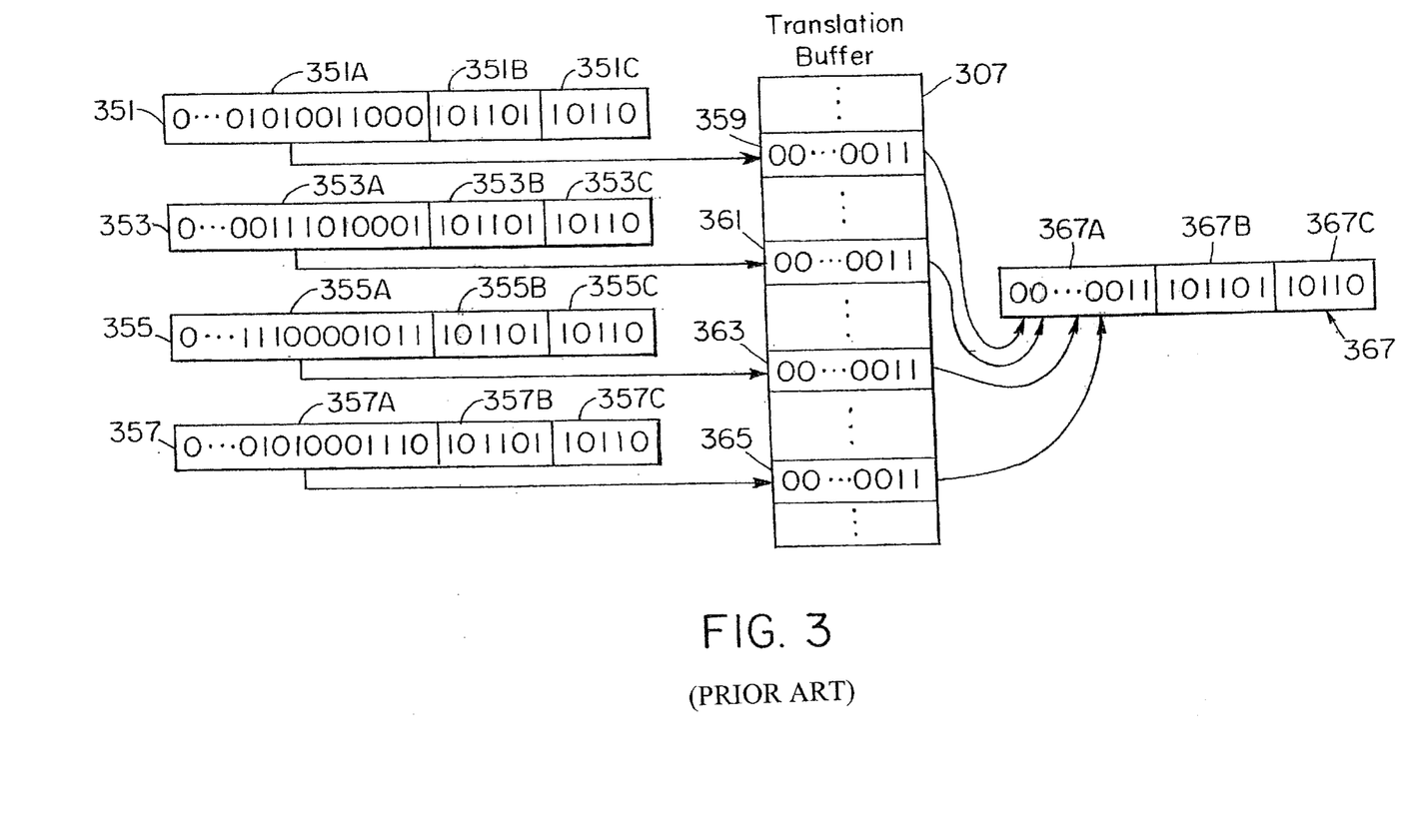
FIG. 3 is a block diagram of a translation buffer demonstrating how several virtual addresses can map to the same physical address.

As FIG. 3 demonstrates, several virtual addresses 351–357 can map to the same physical address. Typically, the translation buffer 307 holds the physical page address at locations indexed by corresponding virtual page address. Using binary digits, virtual address 351 has a virtual page address 351A of 00 . . 01011011000. The corresponding location 359 in the translation buffer 307 happens to hold the physical page address 00 . . 0011, meaning that virtual page address 00 . . 01011011000 has been mapped to physical page address 00 . . 0011. In the example of FIG. 3, three other virtual page addresses (ref. numbers 353, 355 and 357) are also mapped by the translation buffer to physical page address 00 . . 0011.

Figure 4:
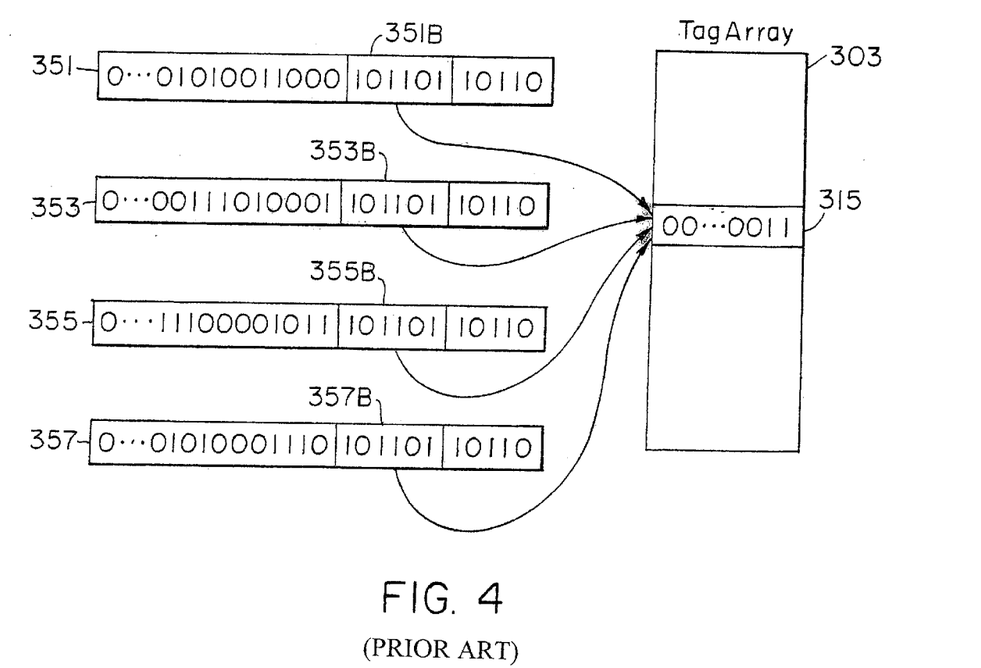
FIG. 4 is a block diagram demonstrating how, in a physically-tagged, physically-indexed tag array different virtual addresses which map to the same physical address refer to the same tag array entry.

In the physically-tagged tag array of FIG. 4, the physical page address 367A (of FIG. 3) is the tag stored in locations in the tag array 303 indexed by the index portions 351B–357B of the respective addresses, which as discussed above, are unmapped and therefore both virtual and physical. Thus, the four virtual addresses of FIGS. 3,4, 351–357, all index the same location 315 in the tag array, because they all have the same index value: 101101. Now, when any one of these virtual locations is referenced, because they all point to the same place in the tag array, it receives the correct tag information.

In the data cache system such as that described in FIGS. 1–4, the cache itself is physically indexed. This means the cache is limited to $2^{13}$ locations where 13 is the number of bits in the index and offset. In modern microprocessors, data cache lookup is one of the core time-critical steps which determine the overall cycle-time of the machine. A larger cache reduces lookup latency, but this presents new problems. The larger the cache, the more bits are required to address it.

Figure 5:
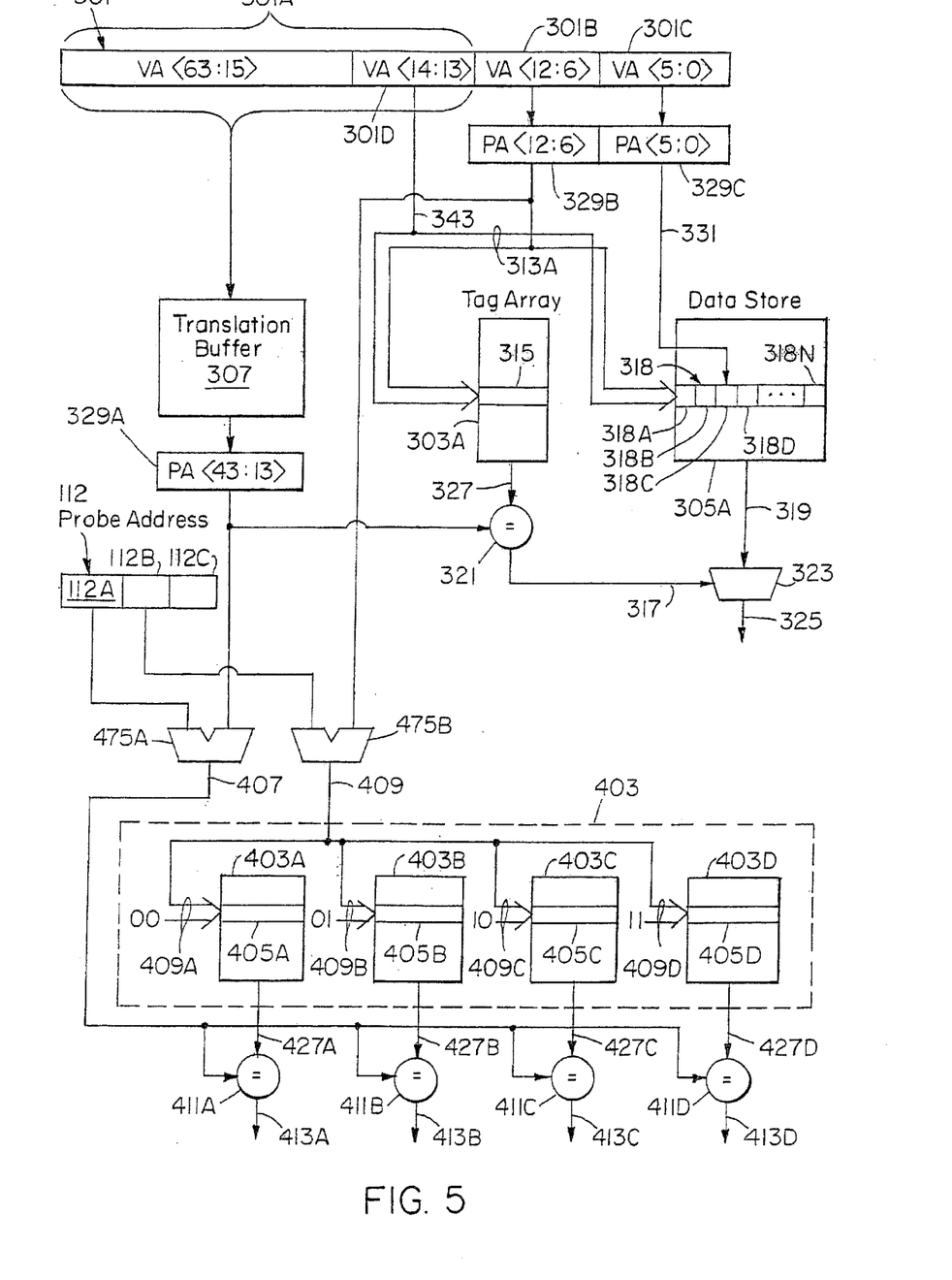
FIG. 5 is a block diagram of a physically-tagged, virtually-addressed data cache system, with a duplicate tag array of the present invention.

FIG. 5 illustrates a physically-tagged, virtually-addressed data cache system, in which the tag array index 313A comprises virtual bits 343. Tag array 303A uses the index 313A to check for a cache hit. If no hit is found, the duplicate tag array 403 is used to substitute other values for bits 301D.

As in the embodiment illustrated in FIG. 1, the virtual address 301 from the CPU core comprises the virtual page address 301A and the unmapped index 301B and offset 301C. Also similarly, the virtual page address 301A is sent to a translation buffer 307 for conversion to the physical page address and the unmapped index bits 301B and offset 301C are transmitted to the tag array 303A and the data store 305A as an index in a look-up process. In order to increase the size of the data store, however, virtual bits 13 and 14 (see reference numeral 301D) are also concatenated with the unmapped bits to look into the tag array and data store. This results in a fifteen-bit data store index. Using virtual bits as a look up into a physically indexed tag array and data store never results in a false indication of a cache hit. This is because virtual address bits 13 and 14 are also passed to the translation buffer and the physical address 329A compared by comparator 321 to the physical page address that is issued from the tag array 303A. In contrast, however, it will sometimes occur that the system will indicate a cache miss when the data in fact resides in the cache. This will occur when virtual address bits 13 and 14 and physical address bits 13 and 14 differ from each other. This false cache miss will occur because using the virtual address bits instead of the physical address bits to look into the tag array causes the system to look in the wrong location for the data with the wrong index. This eventuality is compensated for by the additional inclusion of a duplicate tag structure 403.

In the case of a cache miss, the virtual address bits <12:6> 301B are sent to the duplicate tag array 403 and concatenated with the four separate combinations of virtual address bits VA <14:13> and sent in parallel to four separate tag arrays 403A–403D. The page addresses issued from each of these tag arrays are then compared to the translated page address 329A in four comparators 427A–427D respectively. In this way, the system, in the event of a cache miss, checks all possible combinations of the virtual address bits <14:13> to ensure that the data does not reside in the data store.

According to the invention, the duplicate tag array 403 is also used to perform probe processing to enable other CPUS to determine whether or not the CPU has ownership over data by possessing it in its data store. A physical probe address 112 comprising a physical page address 112A, index 112B and off-set 112C, passes through selectors 475A and 475B. 475B provides the index portion of the probe address 112B as the index into tag arrays 403A–403D. Since the system of the four parallel tag arrays looks up a duplicate tag entry for every combination of bits <14:13>, only bits <12:6> of the probe address are used. The page portion of the probe address 112A is then compared to the output of the tag arrays 403A–403D in comparators 427A–427D to indicate whether or not the data resides in the data store.

In summary, the system according to the present invention allows for larger data stores by increasing the size of the number of bits used in text data store by two bits in the preferred embodiment. Additionally, the use of the duplicate tag array allows probe processing to take place without contention for the primary tag array 303A. The only contention occurs in the simultaneous incidence of a potential cache miss either due to the non-existence of the data in the data store or where virtual address bits <14:13> differ from physical address bits <14:13> and the simultaneous occurrence of a probe to be processed. In this case, there will be some contention for the duplicate tag array.

In a preferred embodiment, the data cache is a 2-way set associative cache. More generally, the data cache may be an n-way set associative cache for any number n. The above discussion applies equally for any value of n.

Cache inefficiency resulting from power-of-two strides can be improved by using a hash function operating on part of a virtual address to construct part of the cache index.

Figure 6:
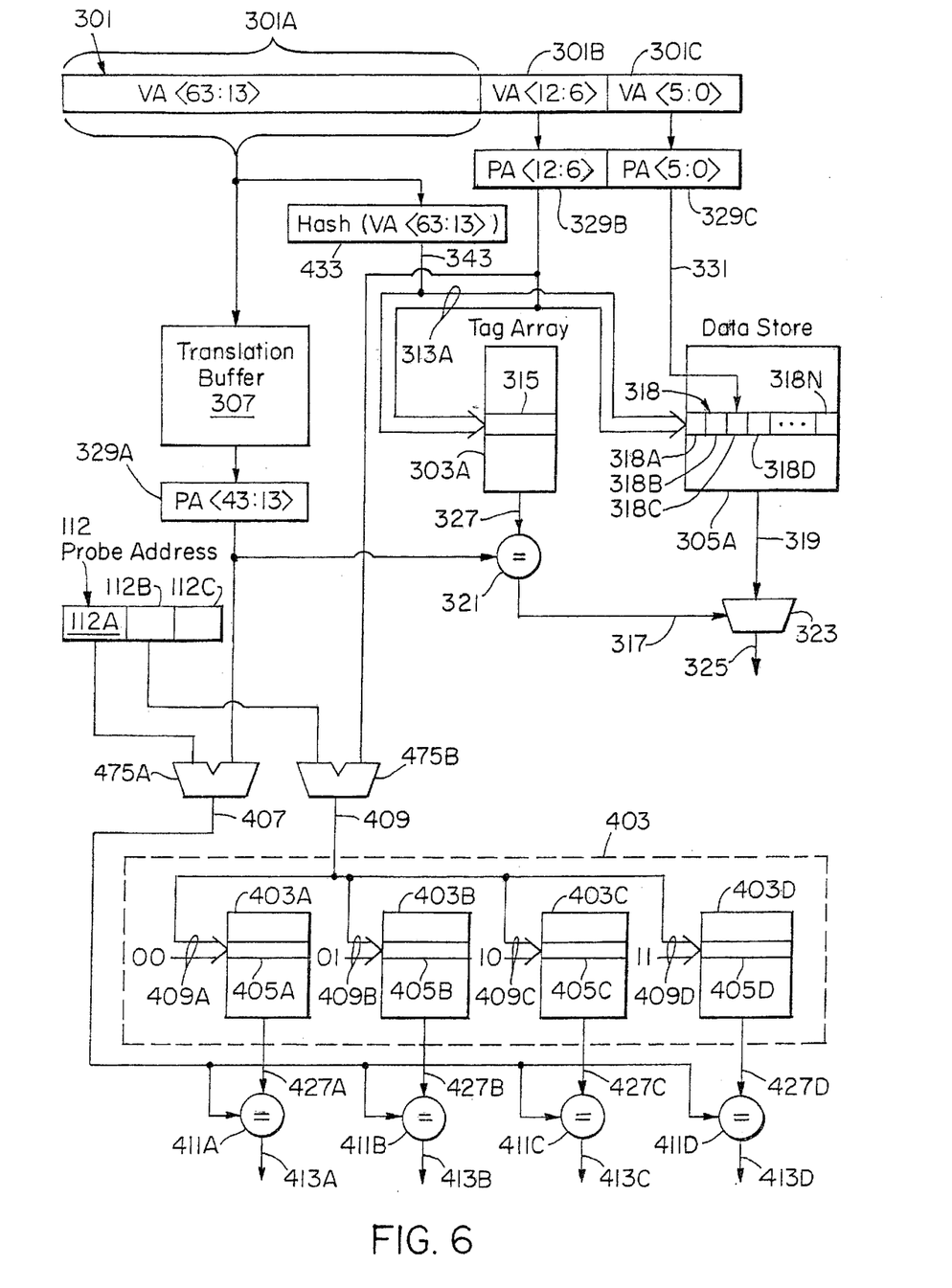
FIG. 6 is a block diagram of a virtually-addressed, physically-tagged data caching system with a hashing function of the tag to create the upper bits of a cache index, and a duplicate tag array.

Finally, FIG. 6 demonstrates the use of a hashing function 433 to create the upper bits 343 of the cache index 313A from the virtual page address 301A.

Because the duplicate tag array 403 already examines the four possible combinations of the virtual address bits, there is no additional overhead created by hashing. Hashing effectively scrambles the placement of, or pseudo-randomly displaces, data within the cache and improves performance without any additional overhead, again, because the duplicate tag array already checks the four combinations of these two bits.

Figure 7:
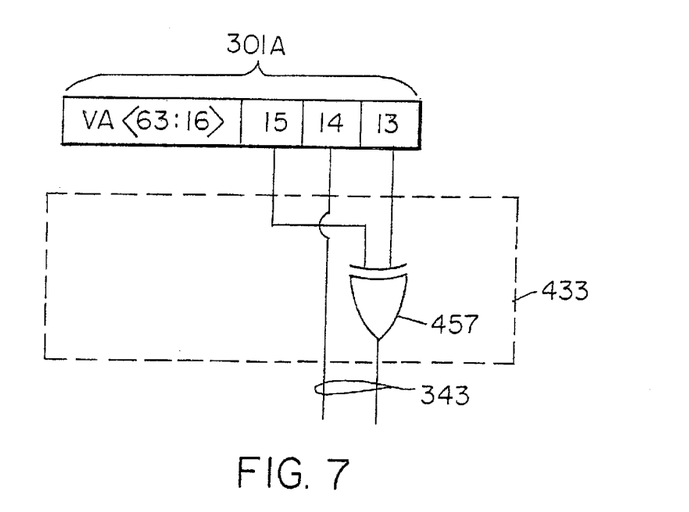
FIG. 7 is a block diagram demonstrating the hashing function of a preferred embodiment of the system of FIG. 6.

FIG. 7 is a block diagram demonstrating the hashing function of a preferred embodiment of the hash function 433 of FIG. 6. The hashing function is simply $$H(<15, 14, 13>) = <14, 15 \text{ XOR } 13>$$

that is, bit 14 is unchanged, and bit 15 is exclusively OR'd with bit 13 Thus, two addresses that are identical in VA<14:6> yet different in VA<15>, such as 0x8000 and 0x000, will have different cache indexes, namely 0x080 and 0x000 respectively. This change accelerates some applications with nearly $2^{15}$ stride by 30% or more, yet this modification to the processor core is implemented at minimal cost. The function is implemented by using an exclusive OR, or XOR, gate 457 to XOR bits 13 and 15 into bit 13 of the cache address, while VA<63:16> are ignored.

In an alternate embodiment, the different data cache sets are hashed independently.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A computer memory data cache system, comprising:

hashing means for hashing an index portion of a virtual address with a virtual page portion of the virtual address to form a cache index;

a data store for holding a plurality of data blocks;

a primary tag array, having a plurality of tag entries corresponding to the data blocks, wherein said data store and primary tag array are addressed with the cache index, the primary tag array providing a plurality of physical address tags corresponding to physical addresses of data resident within corresponding data blocks in the data store addressed by the cache index;

a page translator which translates a tag portion of the virtual address to a corresponding physical address tag;

means for verifying a match between the physical address tag from the page translator and the plurality of physical address tags from the primary tag array, said match indicating that data addressed by the virtual address is resident within the data store; and a duplicate tag array that detects false misses in the primary tag array, including false misses caused by synonyms caused by said hashing of the hashing means.

2. A system as in claim 1, wherein said duplicate tag array is physically indexed.

3. A system as in claim 1, wherein the hashing means is such that addresses which are equivalent mod $2^n$ are pseudo-randomly displaced within the cache for a predetermined integer n.

4. A system as in claim 2, wherein the cache index comprises nine bits.

5. A system as in claim 4, wherein data blocks comprise sixty-four bytes.

6. A system as in claim 1, wherein the physical address tag is a physical page number.

7. A system as in claim 6, wherein a physical page comprises 8 Kb.

8. A system as in claim 1, wherein the hashing means maps VA<14, 15 XOR 13, 12;6> to bits <14:6> of the cache index.

9. A system as in claim 1, wherein the match verifying means is a comparator.

10. A system as in claim 1, wherein the data cache is a 2-way set associative cache.

11. A system as in claim 10, wherein each set has its own hashing function.

12. A method of hashing virtual addresses to reduce collisions in a data cache for memory reference patterns, the method comprising:

issuing a virtual address for data;

hashing bits of an index portion of the virtual address;

addressing the data cache with the hashed index bits;

converting a tag portion of the virtual address to a corresponding physical address tag;

checking whether data for the physical address tag is in the data cache; and checking, in a duplicate tag array, for false misses, including false misses caused by synonyms of the physical address caused by said hashing.

13. A method as in claim 12, wherein the duplicate tag array is physically indexed.

14. A method as in claim 12, wherein the step of hashing comprises pseudo-randomly displacing addresses equivalent mod $2^n$ within the data cache for a predetermined integer n.

15. A method as in claim 13, wherein the cache index comprises nine bits.

16. A method as in claim 15, further comprising organizing the data store into data blocks of sixty-four bytes each.

17. A method as in claim 12, wherein the physical address tag is a physical page number.

18. A method as in claim 17, further comprising forming a physical page from 8 Kb.

19. A method as in claim 12, wherein the hashing step comprises mapping VA<14, 15 XOR 13, 12;6> to bits <14:6> of the cache index.

20. A method as in claim 12, wherein the step of checking whether data for the physical address tag is in the data cache further comprises:

returning a physical address tag from a primary tag array within the data cache, the tag being indexed with the hashed index bits; and comparing the physical address tag from the primary tag array with the physical address tag converted from a tag portion of the virtual address, a match indicating that the physical address tag is in the data cache.

21. A method as in claim 12, wherein the data cache is a 2-way set associative cache.

22. A method as in claim 21, wherein each set hashes with a different hashing function from other sets.

23. A computer memory data cache system, comprising:

a hashing function for hashing an index portion of a virtual address with a virtual page portion of the virtual address to form a cache index;

a data store for holding a plurality of data blocks;

a tag array, having a plurality of tag entries corresponding to the data blocks, wherein said data store and tag array are addressed with the cache index, the tag array providing a plurality of physical address tags corresponding to physical addresses of data resident within corresponding data blocks in the data store addressed by the cache index;

a page translator which translates a tag portion of the virtual address to a corresponding physical address tag;

a comparator for comparing the physical address tag from the page translator and the plurality of physical address tags from the tag array, a match indicating that data addressed by the virtual address is resident within the data store; and a duplicate tag structure for detecting false misses in the primary tag array. including false misses caused by synonyms caused by the hashing of the hashing function.

* * * * *